United States Patent [19]
Katsuno et al.

[11] Patent Number: 5,862,945
[45] Date of Patent: Jan. 26, 1999

[54] BALL QUANTITATIVE SUPPLY SYSTEM

[75] Inventors: Yasuharu Katsuno; Masao Nitta; Masao Okamoto; Atsushi Suzuki; Tsuyoshi Kuribayashi, all of Sayama, Japan

[73] Assignee: Honda Giken Kogyo Kabushiki Kaisha, Tokyo, Japan

[21] Appl. No.: 758,782

[22] Filed: Dec. 3, 1996

[30] Foreign Application Priority Data

| Dec. 5, 1995 | [JP] | Japan | 7-316978 |
| Dec. 5, 1995 | [JP] | Japan | 7-316981 |
| Dec. 5, 1995 | [JP] | Japan | 7-316982 |

[51] Int. Cl.$^6$ ................................................. B65G 59/00
[52] U.S. Cl. .......................................... 221/265; 221/200
[58] Field of Search ................................ 221/265, 263, 221/264, 277, 278, 200, 211, 7, 9

[56] References Cited

U.S. PATENT DOCUMENTS 5,176,290  1/1993  Schwarzli ................................ 221/265

FOREIGN PATENT DOCUMENTS 59-29867 A  2/1984  Japan .

*Primary Examiner*—Kenneth Noland
*Attorney, Agent, or Firm*—Merhcant, Gould, Smith, Edell, Welter & Schmidt, P.A.

[57] ABSTRACT

A ball quantitative supply system is comprised of an upper plate, a lower plate and a rotary block rotatably retained between the upper and lower plates. The upper plate is provided with a ball receiving aperture for receiving balls fed from a ball feeder, and a ball confirming aperture for confirming a predetermined number of balls, the apertures being provided to extend through different portions of the plate when seen in top plan. The lower plate is provided with a ball discharge aperture extending therethrough. The rotary block is provided with a ball receptacle extending therethrough for receiving a predetermined number of balls. The positions of provision of the ball receiving aperture, ball confirming aperture and ball discharge aperture are displaced from each other at an equal interval of 120° as viewed in top plan. With this arrangement, it become possible for the ball receptacle to receive a fixed number of balls, negating the necessity to count the balls using an expensive counter, whereby an apparatus of the described type can be provided at a low cost.

8 Claims, 15 Drawing Sheets

FIG. 7A
FIG. 7B
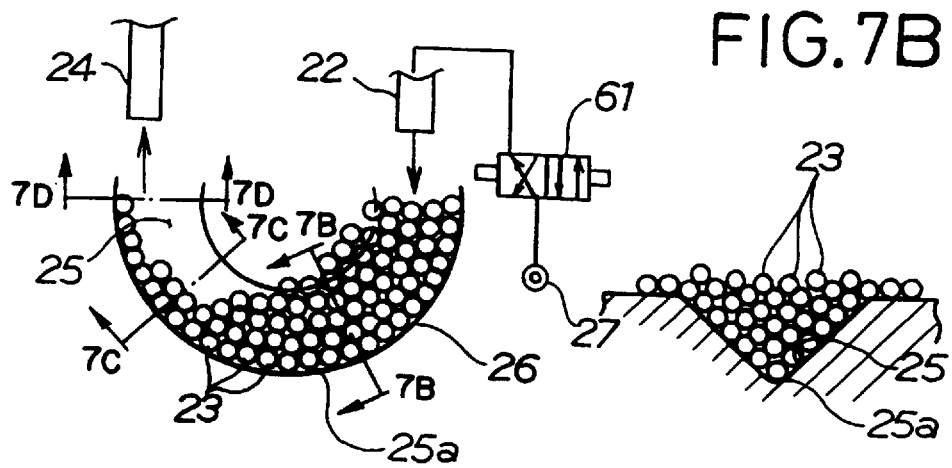
FIG. 7C
FIG. 7D
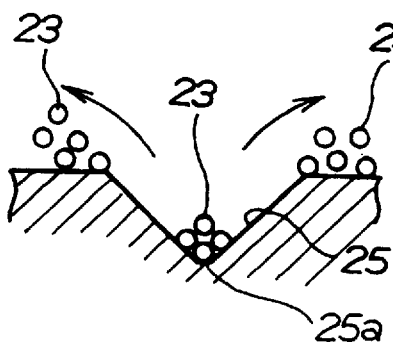
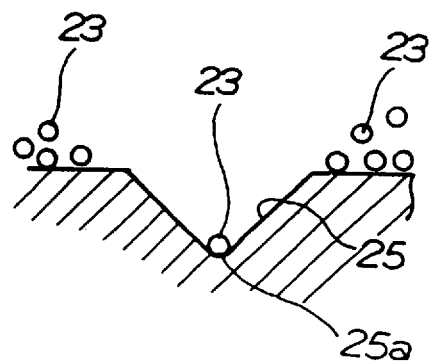

BALL QUANTITATIVE SUPPLY SYSTEM

BACKGROUND OF THE INVENTION

1. Field of the Invention

The present invention relates to a ball quantitative supply system for supplying a fixed quantity of balls of a ball screw used, for example, in a steering mechanism of an automobile to a work such as a nut screw.

2. Description of the Related Art

In some automobile steering mechanisms, ball screws are used. The ball screws are arrangements in which steel balls (hereinafter simply called "balls") are disposed between helical grooves of nut screws and helical grooves of shaft screws. The nut screws are axially movable by rolling the balls by rotational forces of the shaft screws connected to the steering wheels.

For assembling the ball screws, the balls are first supplied to the nut screws, whereafter the nut screws and shaft screws are assembled to form a unitary body.

An example arrangement for assembling such ball screws is disclosed in Japanese Patent Kokai (Laid-Open) Publication No. SHO 59-29867 entitled "SYSTEM FOR AUTOMATICALLY DISTRIBUTING, FEEDING AND PUSHING IN BALLS". In the disclosed system, balls are distributed and supplied from a ball distribution-supply apparatus to a ball push-in apparatus via a plurality of lead pipes. The supplied balls are sent into respective guide apertures formed in the ball push-in apparatus. The balls placed in the guide apertures are pushed into a respective space defined by a helical groove of a nut screw and a helical groove of a shaft screw and placed thereat. The balls are counted by a counter as they are fed from the ball distribution-supply apparatus to the ball push-in apparatus.

However, in the above-described system, an expensive counter is employed to detect the number of balls fed, thus increasing the general cost of the system. Further, since the balls are supplied and discharged through the same guide apertures, the requisite operations are liable to become complicated, whereby erroneous actions are encountered.

The balls are supplied to the nut screws as final works by means of a ball feeder. A typical ball feeder has a casing for accommodating a multitude of balls. A bottom portion of the casing is configured to be an inverted conical trapezoid (in the form of an inverted flask) having a linear cylindrical portion. At a border between the linear cylindrical portion and the inverted conical trapezoid portion, there is provided a ball discharge port. A ball supply port is provided at a lowermost end of the linear cylindrical portion. The diameter of the ball discharge port is slightly larger than the outer diameter of the balls. Thus, by imparting vibrations to the casing, the ball feeder can send out the balls within the casing one by one sequentially from the ball supply port through the ball discharge port.

In this ball feeder, however, since an upper part of the ball discharge port is diverging upwardly, it often happens that two balls get stuck between an upper part of the discharge port and the inner wall surface of the casing by mutual locking engagement of the balls. As a result, inconveniences are experienced such that the balls may not be discharged out from the discharge port.

Reference is now made to FIG. 15 hereof showing the general arrangement of a typical conventional ball quantitative supply apparatus. The ball quantitative supply apparatus 100 is comprised of a ball feeder 101 for sequentially sending out balls, a first shutter 102 disposed downstream of the ball feeder 101 for opening and closing a flow passage of the balls, a counter 103 disposed downstream of the first shutter 102 for counting the balls, a receptacle 104 disposed downstream of the counter 103 for receiving a predetermined number of balls, and a second shutter 105 disposed downstream of the receptacle 104 for opening and closing the flow passage of the balls.

The balls accommodated within the receptacle 104 are fed to a work 106 such as a nut screw.

In the ball quantitative supply apparatus 100, however, since the ball feeder 101, counter 103, receptacle 104, etc. are interconnected by tubes 107, the ball quantitative supply apparatus 100 inevitably becomes large in size.

Further, the balls fed to the counter 103 become excessive in number or fall short unless the opening and closing actions of the first shutter 102 are made at precise timing.

Moreover, it may not be known with certainty whether the balls are securely supplied to the work 106 by only opening the second shutter 105 to send the balls to the work.

Reference is now made to FIG. 16 in which the general arrangement of a ball quantitative supply apparatus 110 which is an improved version of the ball quantitative supply apparatus shown in FIG. 15. The improved ball quantitative supply apparatus 110 is comprised of a base or body 112 having a rotary block 111, an air cylinder 113 for effecting the rotation of the rotary block 111, a ball feeder (not shown) for feeding balls 114 to the rotary block 111, a ball detector 115 for detecting the number of the balls 114 within the rotary block 111 and a ball discharge mechanism 116 for discharging the balls 114 held in the rotary block 111.

For feeding the balls 114 to a work 117 by the ball quantitative supply apparatus 110, the balls 114 are firstly sent out from the ball feeder to a ball receptacle 111a of the rotary block 111 via a ball receiving aperture (not shown) formed in an upper plate 118. Then, a magnetic valve 119 is operated to actuate the air cylinder 113 by a source of air supply 120 to thereby rotate the rotary block 111. By levelling rotation of the rotary block 111, balls (not shown) retained in the ball receiving aperture of the upper plate 118 positioned upwardly of the ball receptacle 111a are cut off and separated from the balls retained in the ball receptacle 111a, thus leaving a predetermined number of the balls 114 in the ball receptacle 111a.

By further rotating the rotary block 111, the ball receptacle 111a containing the balls 114 is positioned at the ball detector 115.

Next, a magnetic valve 121 is actuated to supply air from the source of air supply 120 to the air cylinder 122 of the ball detector 115. A piston rod 122a of the air cylinder 122 is descended until a lower end of the piston rod 122a is place in abutment against an uppermost one of the balls 114 within the ball receptacle 111a. The height of the piston rod 122a at this time is detected to ascertain that a predetermined number of balls 114 is accommodated within the ball receptacle 111a.

Continuously, the magnetic valve 119 is again operated to rotate the rotary block 111 by the air cylinder 113 so as to move the ball receptacle 111a to the ball discharge mechanism 116. Then, a magnetic valve 123 is operated to cause an air cylinder 124 of the ball discharge mechanism 116 to contract. By contraction of the air cylinder 124, push rods 125 connected to a piston rod 124a of the air cylinder 124 are lowered to be introduced into the ball receptacle 111a so as to push the balls 114 within the ball receptacle 111a into the work 117 through a ball discharge aperture 126a of a lower plate 126.

The improved version ball quantitative supply apparatus 110 is rendered small in size, because the ball feeder, ball detector 115, ball discharge mechanism 116, and so forth are unitarily assembled without using tubes.

Also, by rotating the rotary block 111, a predetermined number of balls 114 can be securely obtained, whereby the relevant control becomes easy.

In addition, since the balls 114 are pushed into the work 117 by the respective push rods 125 within the ball discharge mechanism 116, the balls 114 can be fed into the work 117 securely.

However, in the above-described improved version ball quantitative supply apparatus 110, it is necessary to prevent the rotary block 111 from rotating when the push rods 125 of the ball discharge mechanism 116 are inserted into the respective ball receptacles 111a of the rotary block 111. Thus, sensors 130a, 130b are used to detect the expansion/contraction position of the piston rod 113a of the air cylinder 113. Similarly, sensors 131a, 131b are employed to detect the expansion/contraction position of the piston rod 122a of the air cylinder 122. The expansion/contraction position of the piston rod 124a of the air cylinder 124 is detected by sensors 132a, 132b.

Position confirming section 134 confirms the position of each cylinder based on detected signals output from each sensor and sends the confirmed data to a control section 135. Based on the confirmed data, the control section 135 controls the magnetic valves 119, 121, 123 to operate the air cylinders 113, 122, 124. Thus, the control involves complicated conditions which may lead to misoperations.

To this end, it is demanded that a single switch be capable of operating the cylinders to thereby prevent misoperations liable to occur during operation of the cylinders.

SUMMARY OF THE INVENTION

According to a first aspect of the present invention, a ball quantitative supply system comprises an upper plate, a lower plate and a rotary block rotatably retained between the upper and lower plates. The upper plate includes a ball receiving aperture for receiving balls fed from a ball feeder, and a ball confirming aperture for confirming a predetermined number of balls, which apertures extend through different portions thereof when seen in top plan. The lower plate has a ball discharge aperture extending therethrough. The rotary block is provided with a ball receptacle extending therethrough for receiving a predetermined number of the balls. After the balls are received in the ball receptacle of the rotary block, a row of the balls continuing from the receiving aperture of the upper plate to the ball receptacle is cut off by levelling rotation of the rotary block so that the balls in the receiving aperture and the balls in the ball receptacle are separated from each other. As a result, a predetermined number of the balls is provided to the ball receptacle, thus negating the necessity for the use of expensive counting devices for counting the number of the balls.

In a preferred form of the ball quantitative supply apparatus according to the present invention, the ball receiving aperture, ball confirming aperture and ball discharge aperture are disposed at different positions. With a predetermined number of the balls received in the rotary block, ball confirmation and ball discharge operations are performed at the respective locations by transferring the balls to the ball confirming aperture and ball discharge aperture. Consequently, the ball supply process, ball confirming process and ball discharge process can be achieved independently, whereby operations associated with each process are rendered simple and easy and misoperations are rendered unlikely to occur.

Preferably, the ball receiving aperture, ball confirming aperture and ball discharge aperture are positioned such that they are displaced from each other on a circumference as seen in top plan at an equal pitch of 120°. This arrangement enables simultaneous performance of the ball supply operation, ball confirming operation and ball discharge operation, thus improving the productivity.

According to a second aspect of the present invention, a ball quantitative supply system includes a ball feeder for sequentially sending out a plurality of balls in a row. The ball feeder is comprised of a ball receiving chamber having a guide groove of V-shaped cross section, an air blowing portion, and a ball discharge port. By blowing air from the air blowing portion into the guide groove, the balls in the ball receiving chamber circulated along the guide groove. In a preferred form, the guide groove has a guide passage provided at a bottom thereof for guiding a single ball. By this arrangement, the balls are guided along the guide passage one by one. Thus, the ball feeder according to the present invention is adapted to guide a single ball through the guide passage to the ball discharge port and discharge the ball from the ball discharge port by a pressure of air.

Preferably, the air blowing portion of the ball feeder is positioned at one end of a horizontal center line of the guide groove of circular shape as seen from sideways. The position of the ball discharge port is at the other end opposite from the position of the air blowing portion. In this arrangement, the ball in the guide groove is smoothly circulated along the guide groove since air is blown into the guide groove from an end thereof. Thus, the balls are securely guided one by one along the guide passage of the guide groove.

In a preferred form, at least a lower half of the guide groove has a V-shaped cross section as seen in side elevation. With this arrangement, the balls are securely guided one by one along the guide passage of the guide groove to the ball discharge port.

According to a third aspect of the present invention, a ball quantitative supply system comprises first drive means for rotating a rotary block having a ball receiving portion for receiving a predetermined number of balls, second drive means for effecting up and down movements of a detection rod for confirming balls within the ball receiving portion, and third drive means for effecting up and down movements of a push rod for discharging balls within the ball receiving portion. The rotary block is rotatably retained by an upper plate and a lower plate. The ball quantitative supply system further includes a single changeover device which makes the second and third drive means inactive when the first drive means is actuated, and causes the second and third drive means to be actuated when the first drive means is inactive. Since the first, second and third drive means can thus be placed in a desired condition by means of the single changeover device, misoperations of the ball quantitative supply system can be prevented. In the ball quantitative supply system according to the present invention, the first, second and third drive means are connected to a common source of drive force. As a result, such apparatus can be provided inexpensively.

Preferably, air is used as the drive force source of the ball quantitative supply system according to the present invention. As a result, a source of air supply to the ball feeder can also be used as the drive force source of the first, second and third drive means. The changeover device preferably comprises an air flow path switching valve. By virtue of the switching valve, the changeover device is rendered simple in construction and hence such device becomes less expensive.

BRIEF DESCRIPTION OF THE DRAWINGS

Preferred embodiments of the present invention will hereinafter be described in more detail with reference to the accompanying drawings, in which:

FIGS. 7A–7D are explanatory views illustrating the operation of a ball feeder according to the present invention, FIG. 7A being a partial cross-sectional view taken along line 7—7 of FIG. 6, FIG. 7B being a cross-sectional view taken along line b—b of FIG. 7A, FIG. 7C being a cross-sectional view taken along line c—c of FIG. 7A, FIG. 7D being a cross-sectional view taken along line d—d of FIG. 7A;

DETAILED DESCRIPTION OF THE PREFERRED EMBODIMENT

Figure 1:
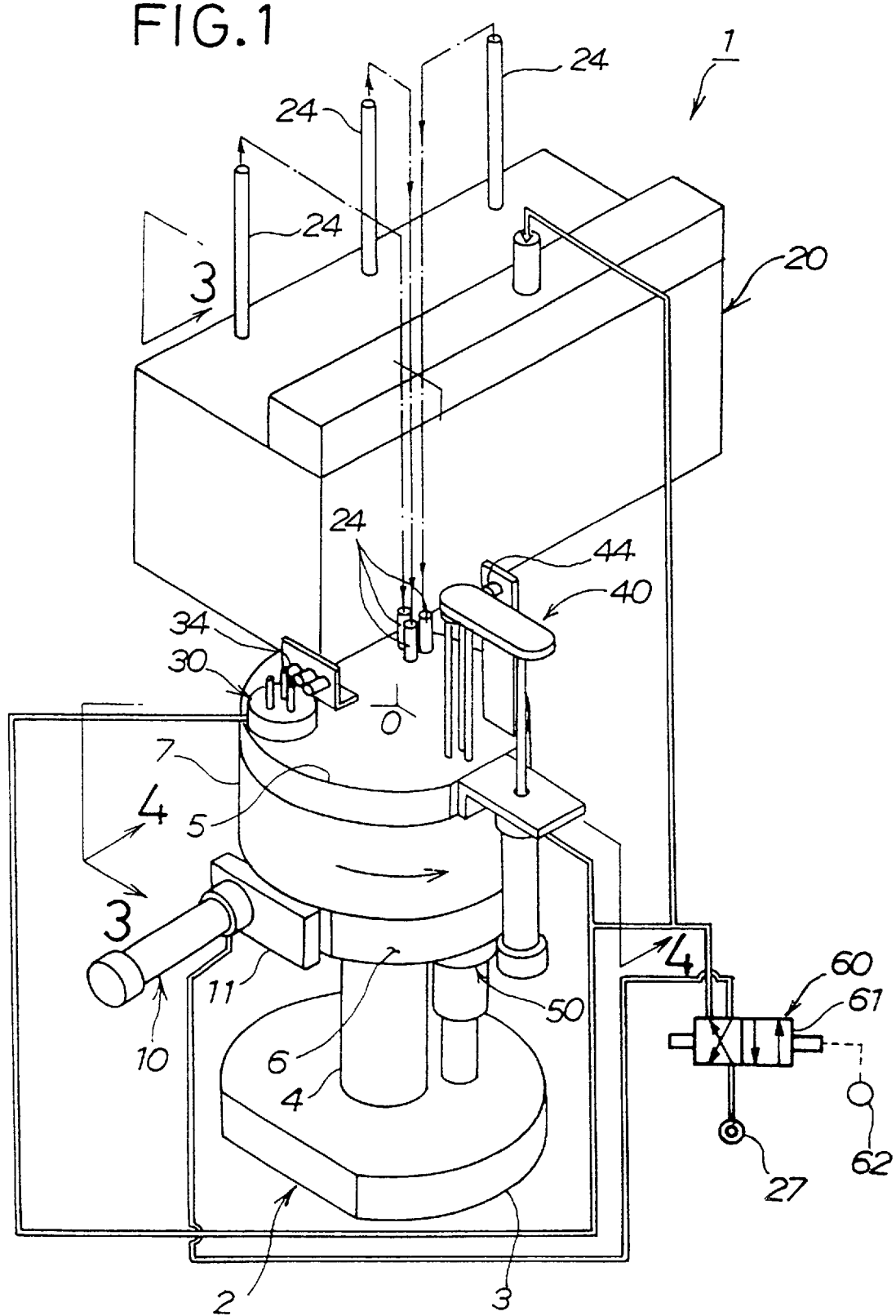
FIG. 1 is a perspective view showing the general arrangement of a ball quantitative supply system according to the present invention.

Referring to FIG. 1, a ball quantitative supply system 1 comprises a body apparatus 2 having a rotary block 7, a rotation drive apparatus 10 for rotating the rotary block 7, a ball feeder 20 for supplying balls to the rotary block 7, a ball detector 30 for detecting the balls within the rotary block 7, a ball discharge apparatus 40 for discharging the balls from the rotary block 7, a nut screw retaining apparatus 50, and a changeover device 60.

The body apparatus 2 includes a support post 4 extending upwardly from a base 3, upper and lower plates 5, 6 mounted to the support post 4, and the rotary block 7 rotatably sandwiched between the upper and lower plates. Above the upper plate 5, there are provided the ball feeder 20, ball detector 30 and ball discharge apparatus 40. The lower plate 6 is provided with the rotation drive apparatus 10 and nut screw retaining apparatus 50.

The changeover device 60 includes a magnetic valve 61 and a changeover switch 62. The magnetic valve 61 is switched by means of the changeover switch 62 such that the actuation of the ball detector 30 and ball discharge apparatus 40 may not coincide with the actuation of the rotation drive apparatus 10.

Figure 2:
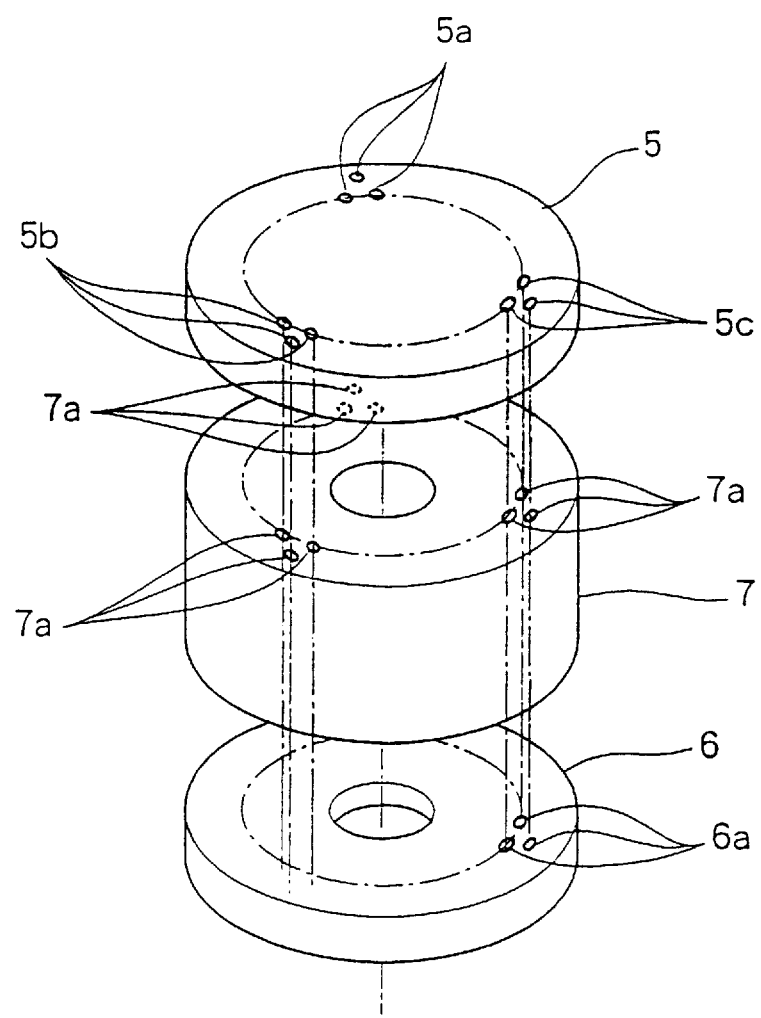
FIG. 2 is an exploded perspective view of a body apparatus of the supply system.

Referring now to FIG. 2, the upper plate 5 includes three ball receiving apertures 5a extending vertically therethrough, three ball confirming apertures 5b and three rod insertion apertures 5c, which are equidistantly displaced from each other. These apertures 5a, 5b, 5c are provided on the same circumference.

The rotary block 7 has three sets of ball receptacles 7 disposed at an equal interval, each set being composed of three ball receptacles 7a. The three ball receptacles 7a forming each set are brought into alignment with the ball receiving aperture 5a of the upper plate 5 and the ball confirming aperture 5b or the rod insertion aperture 5c by rotation of the rotary block 7.

The lower plate 6 includes three ball discharge apertures 6a passing vertically therethrough. The three ball discharge apertures 6a are positioned such that they come into alignment with the rod insertion apertures 5c of the upper plate 5 as viewed in top plan.

Figure 3:
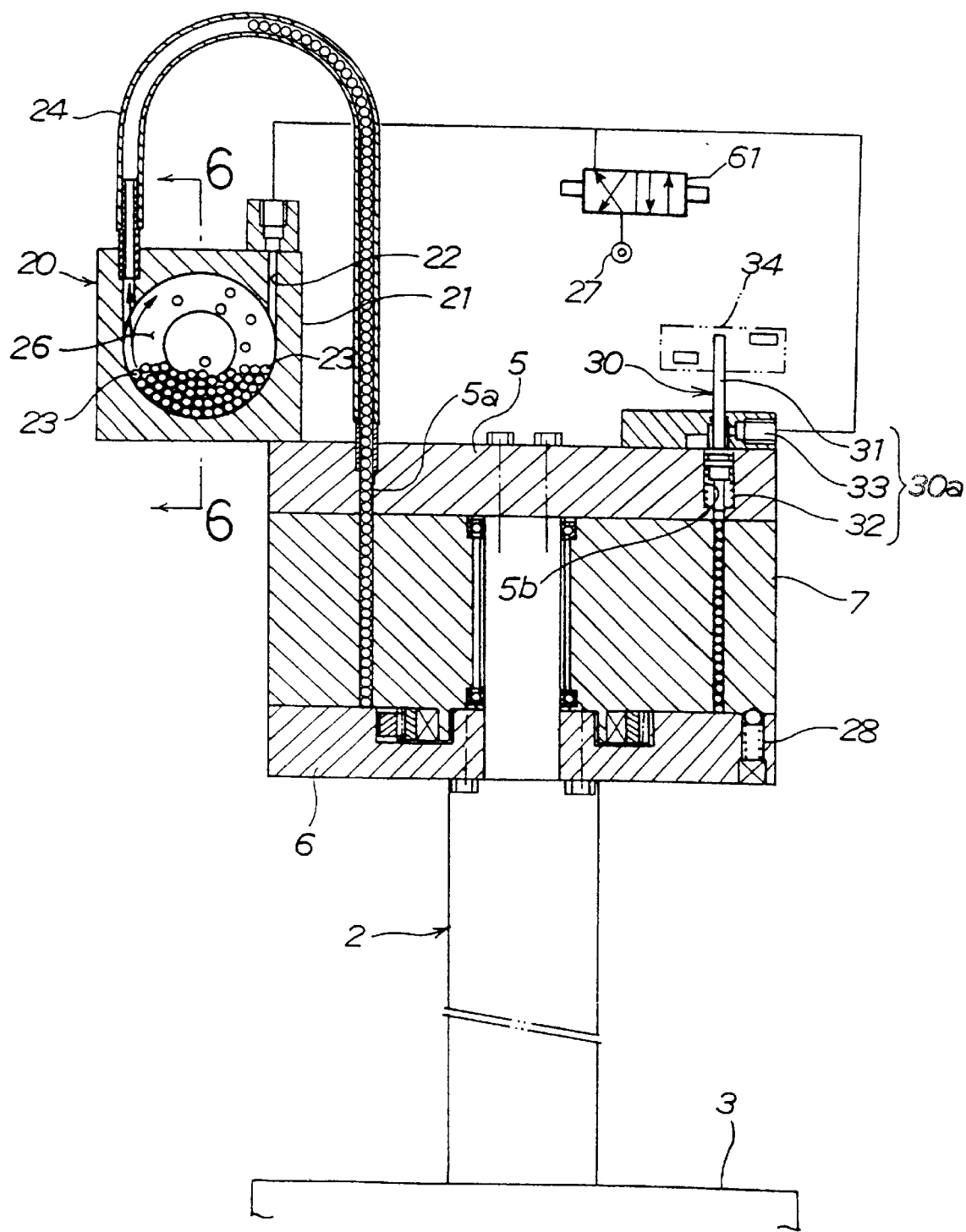
FIG. 3 is a cross-sectional view taken along line 3–0–3 of FIG. 1.

Turning to FIG. 3, the ball feeder 20 is comprised of a ball receiving case 21 having a ball receiving chamber 26 for receiving a plurality of balls 23, an air blow portion (air blow means) 22 communicating with the magnetic valve 61 and opening into the ball receiving case 21, and a ball send-out pipe (ball discharge port) 24 of an inverted J-shaped configuration communicating the ball receiving aperture 5a of the upper plate 5 with the inside of the ball receiving case 21. Three ball send-out pipes 24 are provided on the ball feeder 20, as seen from FIG. 1.

The ball detector 30 has an air drive portion (second drive means) 30a, which is composed of a piston rod (detection rod) 31 passing through the ball confirming aperture 5b, a return spring 32 urging the piston rod 31 upwardly, and an air supply portion 33 communicating with the magnetic valve 61. When air is supplied to the air supply portion 33, the piston rod 31 is pressed downwardly against the upward biasing force of the return spring 32.

The ball detector 30 has a sensor 34 for detecting the position of the piston rod 31. Designated by reference numeral 28 is a detent mechanism (clique mechanism). The detent mechanism 28 acts to position the ball receptacles 7a of the rotary block 7, ball receiving apertures 5a of the upper plate 5 and ball confirming apertures 5b or rod insertion apertures 5c on a coaxis as shown in FIG. 2.

Figure 4:
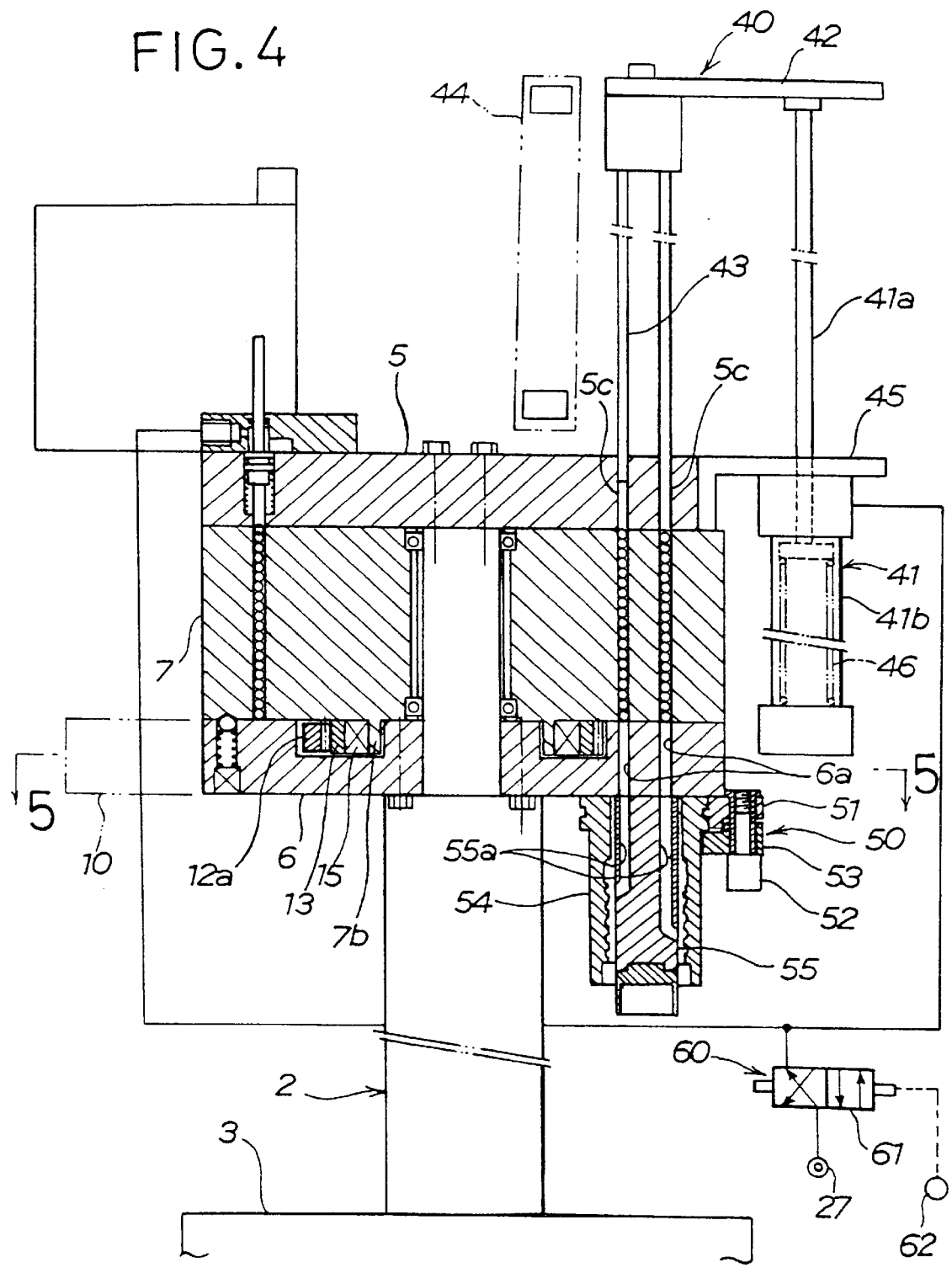
FIG. 4 is a cross-sectional view taken along line 4–0–4 of FIG. 1.

Referring to FIG. 4, the ball discharge apparatus 40 is comprised of an air cylinder (third drive means) 41 mounted to the upper plate 5, three push rods 43 (only two shown in the figure) connected to the piston rod 41a of the air cylinder 41 via a connector plate 42, and a sensor 44 (see FIG. 1) for detecting the position of the push rods 43. The push rods 43 are inserted into the rod insertion apertures 5c of the upper plate 5.

Designated by reference numeral 45 is a bracket for mounting the air cylinder 41 to the upper plate 5. Reference numeral 46 designates a return spring disposed in the cylinder 41b of the air cylinder 41 and constantly urging the piston rod 41a upwardly. Reference numeral 7b designates an annular portion formed to project downwardly from the rotary block 7.

The nut screw retaining apparatus 50 is composed of an anchoring block 51 mounted to the lower plate 6, and a retainer block 53 connected to the anchoring block 51 by means of a bolt 52, and is designed to retain a nut screw 54 by the anchoring block 51 and retainer block 53.

Reference numeral 55 designates a dummy shaft screw, which is positioned within the nut screw 54 and has three guide apertures 55a (only two shown in the figure) provided on the coaxis on which the three ball discharge apertures 6a (only two shown in the figure) of the lower plate 6 are provided.

Figure 5:
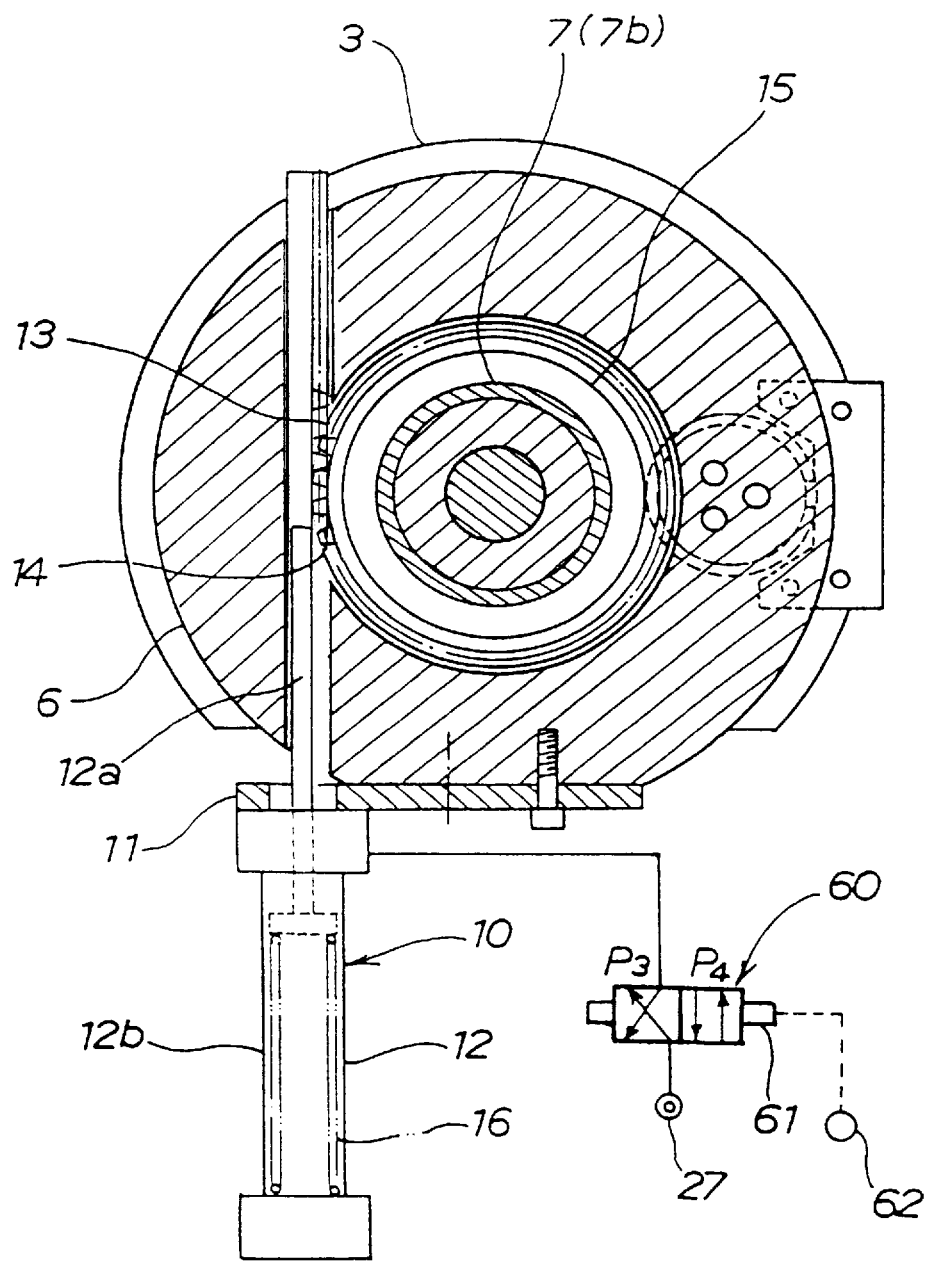
FIG. 5 is a cross-sectional view taken along line 5—5 of FIG. 4.

As shown in FIG. 5, the rotation drive apparatus 10 is comprised of the air cylinder (first drive means) 12 mounted to the lower plate 6 such that it communicates with the magnetic valve 61, a rack 13 mounted to the piston rod 12a of the air cylinder 12, an annular pinion 14 designed to mesh with the rack 13, and a one-way clutch 15 for rotating the annular portion 7b of the rotary block 7 together with the pinion 14 in only a counter-clockwise direction.

Designated by reference numeral 11 is a bracket for mounting the air cylinder 12. 16 designates a return spring, which is disposed within the cylinder 12b of the air cylinder 12 for urging the piston rod 12a in a direction of projection thereof.

When air is supplied from the source of air supply 27 to the air cylinder 12, the piston rod 12a contracts against the resiliency of the return spring 16. That is, if the piston rod 12a moves downwardly in the figure, the rack 13 moves together with the piston rod 13a, whereupon the pinion 14 turns in a counter-clockwise direction in the figure. Consequently, the rotary block 7 turns in a counter-clockwise direction via the one-way clutch 15 by 120°.

Next, when air supply to the air cylinder 12 is terminated, the piston rod 12a projectingly extends by the resilient force of the return spring 16. That is, the piston rod 12a moves upwardly in the figure. The rack 13 moves with the piston rod 12a to rotate the pinion 14 in a clockwise direction. At this time, the rotary block 7 does not rotate, because the one-way clutch 15 is released from its clutching operation.

Figure 6:
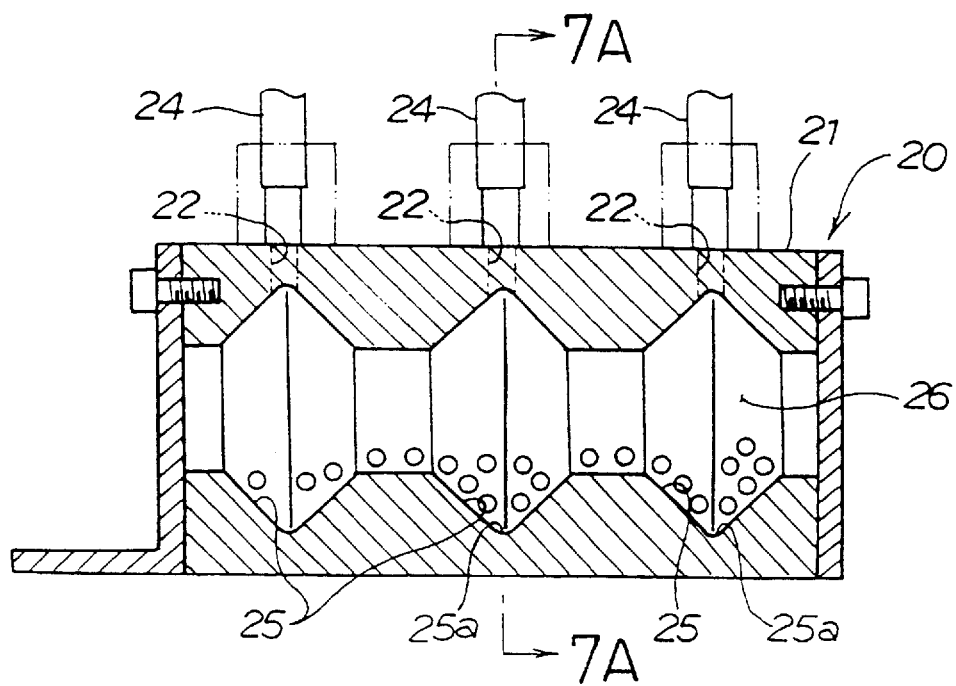
FIG. 6 is an enlarged sectional view taken along line 6—6 of FIG. 3.

Reference is now made to FIG. 6 in which the ball feeder is shown in enlarged section taken along line 6—6 of FIG. 3.

In the ball receiving case 21, there are provided three ball receiving chambers 26 communicating with each other. Each ball receiving chamber 26 has a circular configuration as seen from sideways (see FIG. 3). On the circumference of each ball receiving chamber 26, there is provided a V-shaped guide groove 25. Each guide groove 25 may be provided in at least a lower half of the ball receiving chamber 26 of circular configuration as seen in side elevation. Each guide groove 25 has a guide passage 25a allowing passage of only one ball at a time. In the ball receiving case 21, air blow portions 22 are provided such that they face an end of the guide grooves 25. At an opposite end of each guide groove 25, there is provided a ball send-out pipe 24 for discharging air and the balls (see FIG. 3).

Discussion will next be made as to the operation of the ball quantitative supply system according to the present invention, referring to FIGS. 7A–7D illustrating the actions of the balls within the ball receiving chamber.

As shown in FIG. 7A, air supplied from the air supply source 27 is blown into the ball receiving chamber 26 via the air blowing portion 22. By the blown air, the balls 23 are circulated within the ball receiving chamber 26.

FIG. 7B shows a vicinity of the air blowing portion. At a position in the vicinity of the air blowing portion, the balls are received in the V-shaped guide groove 25.

Shown in FIG. 7C is a sectional position relatively away from the air blowing portion. At this position, many balls 23 fly out from the V-shaped guide groove 25.

FIG. 7D shows a vicinity of the ball send-out pipe. At this position, one ball 23 is left in the guide passage 25a of the V-shaped guide groove 25. The single ball 23 remaining in the guide passage 25a is sent along the guide passage 25a into the send-out pipe 24 (see FIG. 7A).

Figure 8:
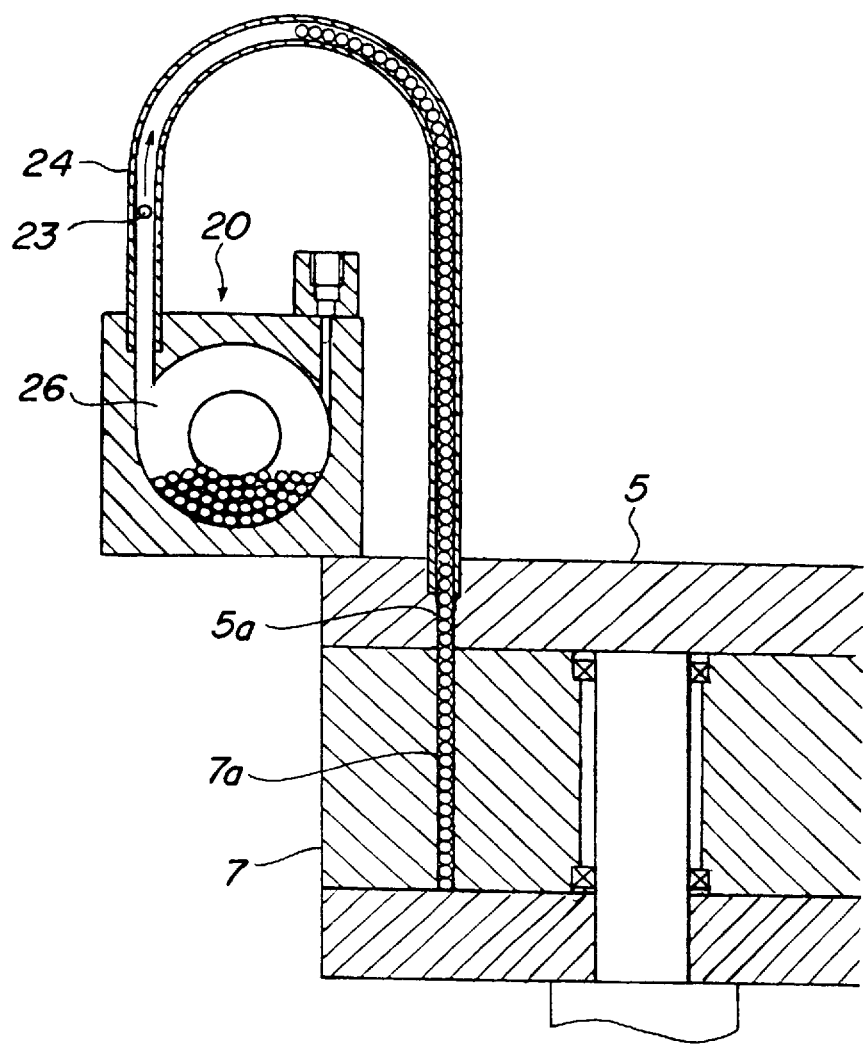
FIG. 8 is an explanatory view illustrating an operation in which balls are fed from the ball feeder to the body apparatus of the ball quantitative supply system.

Shown in FIG. 8 is the action of the ball 23 discharged from the ball feeder 20. The ball 23 entered into the ball send-out pipe 24 is elevated up to the top portion of the inverted J-shaped send-out pipe 24 by an air pressure and then descends through the pipe 24 until it enters the ball receiving aperture 5a of the upper plate 5. Finally, the ball is received in the ball receptacle 7a of the rotary block 7.

Figure 9:
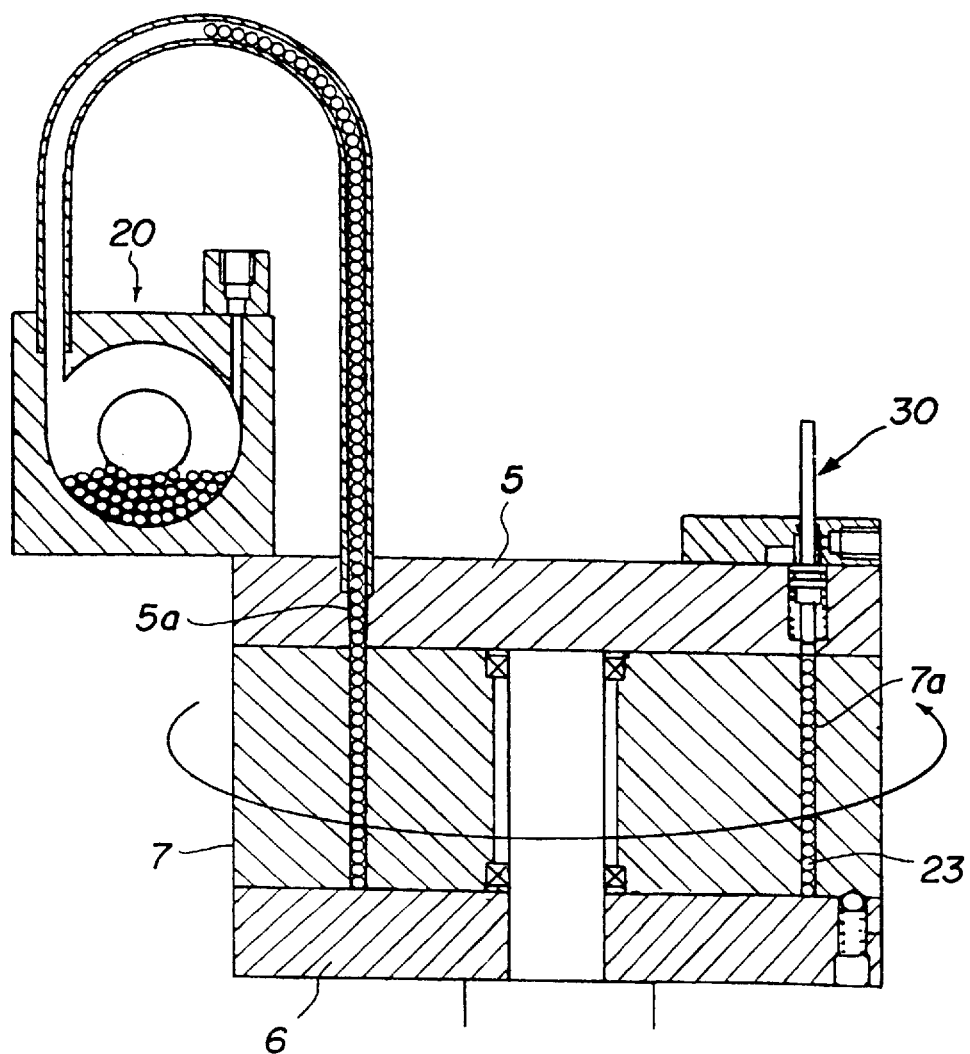
FIG. 9 is a cross-sectional view illustrating the body apparatus of the quantitative supply system with a rotary block thereof being rotated.

FIG. 9 illustrates a condition of rotation of the rotary block 7.

When the rotary block 7 is rotated by the rotation drive apparatus 10 shown in FIG. 5, the ball receptacle 7a receiving the plural balls 23 moves to the location of the ball detector 30. By levelling rotation of the rotary block 7, the row of balls in the ball receiving aperture 5a of the upper plate 5 is cut off and separated from the row of balls 23 in the ball receptacle 7a, thus leaving a fixed number of balls 23 in the ball receptacle 7a.

Figure 10:
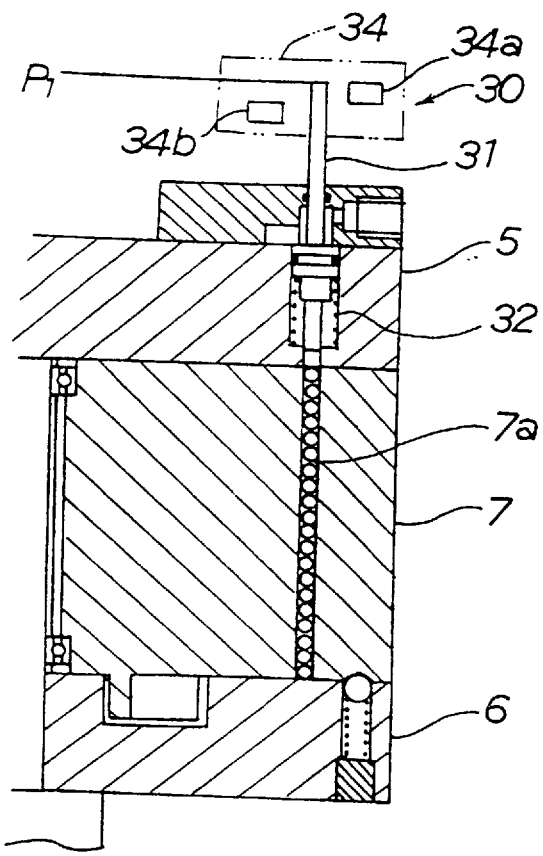
FIG. 10 is a cross-sectional view showing a ball detector before actuation.

FIG. 10 illustrates the ball detector before actuation. The piston rod 31 is positioned at a non-detection position $P_1$ by the resiliency of the return spring 32 and detects the presence or absence of the piston rod 31 by an upper position detecting portion 34a of the sensor 34. Consequently, it is confirmed that the piston rod 31 is positioned at the non-detection position $P_1$.

Figure 11:
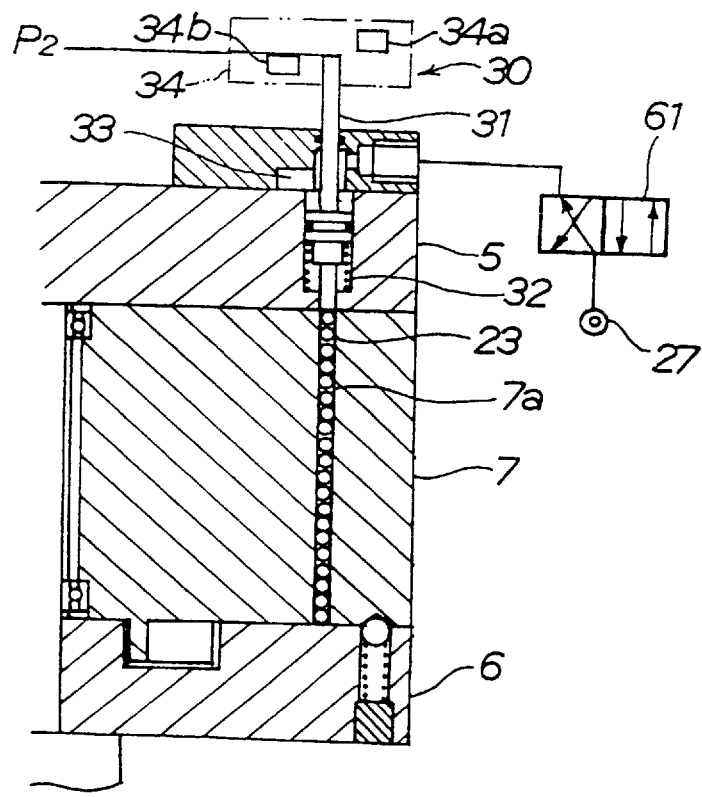
FIG. 11 is a cross-sectional view showing the ball detector being actuated.

FIG. 11 shows the ball detector in actuation. When air is supplied from the air source 27 to the air supply portion 33, the piston rod 31 descends against the resiliency of the return spring 32 until a lowermost end of the piston rod 31 abuts against a topmost ball 23. In this instance, the piston rod 31 is positioned at a ball detecting position $P_2$, and a lower position detection portion 34b of the sensor 34 detects the piston rod 31. Confirmation is thus made as to whether the fixed number of balls 23 is received in the ball receptacle 7a of the rotary block 7.

Figure 12:
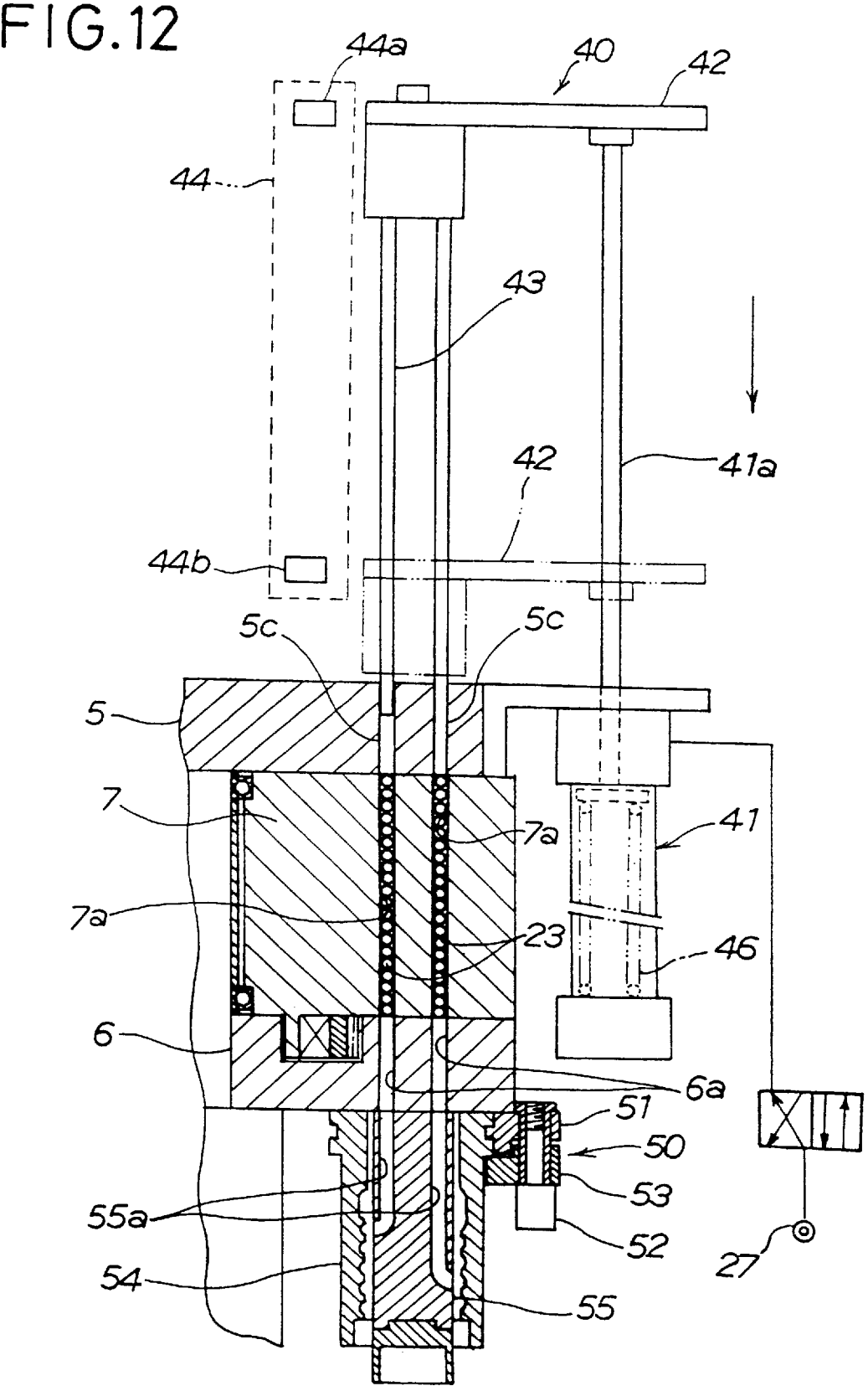
FIG. 12 is a schematic view illustrating a manner in which a predetermined number of received balls are discharged.

FIG. 12 illustrates the action of the ball discharge apparatus. As explained with reference to FIG. 11, after the number of balls 23 in the ball receptacle 7a is confirmed by the ball detecting means 30, the rotary block 7 is rotated in a counter-clockwise direction by 120° by means of the rotation drive apparatus 10 shown in FIG. 5. The ball receptacle 7a is moved to the ball discharge apparatus 40.

Simultaneously with the stoppage of air supply to the air cylinder 12 (see FIG. 5), air is supplied from the source of air supply 27 to the air cylinder 41 of the ball discharge apparatus 40. By this air supply, the piston rod 41a contracts against the resiliency of the return spring 46 to descend the push rods 43 connected to the piston rod 41a. The push rods 43 are inserted through the ball discharge apertures 5c into the ball receptacles 7a to push the balls 23 within the ball receptacles 7a out to the ball discharge apertures 6a of the lower plate 6.

Upper position detection portion 44a of the sensor 44 detects the extension of the piston rod 41a, while lower position detection portion 44b detects the contraction of the piston rod 41a.

As discussed above, the ball receiving apertures 5a, ball confirming apertures 5b and ball discharge apertures 5c are disposed at different positions. With a fixed number of balls 23 received in the rotary block 7, the balls 23 are transferred to the ball confirming apertures 5b and the ball discharge apertures 5c for the ball confirming and discharge processes at their respective positions. Thus, the ball supply process, ball confirming process and ball discharge process can be carried out independently.

By providing the rotary block 7 with three sets of ball receptacles 7a, each composed of three receptacles 7a, passing therethrough at equal intervals, the ball supply process ball confirming process and ball discharge process can be performed independently at the same time.

Figure 13:
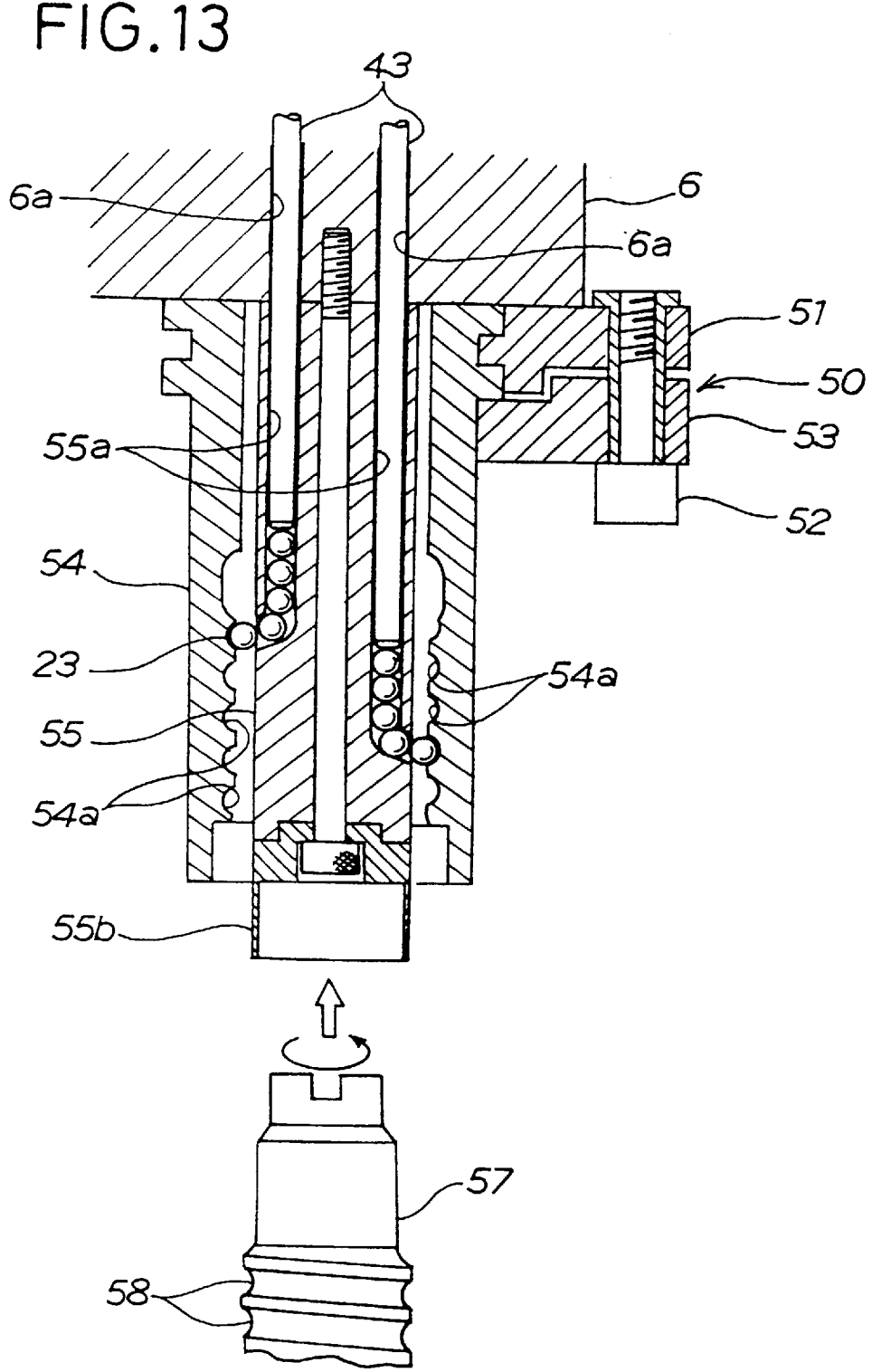
FIG. 13 is a schematic view illustrating a manner of assemblage of a ball screw.

FIG. 13 illustrates a manner for assembling or building up a ball screw. By tightening the bolt 52 of the nut screw retaining apparatus 50, the nut screw 54 is retained in a sandwiched fashion at a predetermined position by the anchoring block 51 and retainer block 53. The dummy shaft screw 55 is placed within the nut screw 54. The guide holes or apertures 55a of the dummy shaft screw 55 are located on a coaxis of the ball discharge apertures 6a of the lower plate 6. Accordingly, the balls 23 pushed out from the ball discharge apertures 6a enter into the guide holes or apertures 55a of the dummy shaft screw 55 and move therefrom to helical grooves 54a of the nut screw 54.

After the push rods 43 are moved upwardly to their original positions as shown in FIG. 12, the shaft screw 57 is turned and moved upwardly until an upper end of the shaft screw 57 is engaged in a receiving portion 55b provided at a lower end of the dummy shaft screw 55. Thereafter, the bolt 52 is loosened to release the nut screw 54 from retaining by the anchoring block 51 and retainer block 53 so that the nut screw 54 descends to cause the balls 23 received in the helical grooves 54a of the nut screw 54 to be engaged in helical grooves 58 of the shaft screw 57. This concludes the ball screw assembling or build-up process for assembling the shaft screw 57 with the nut screw 54.

Figure 14:
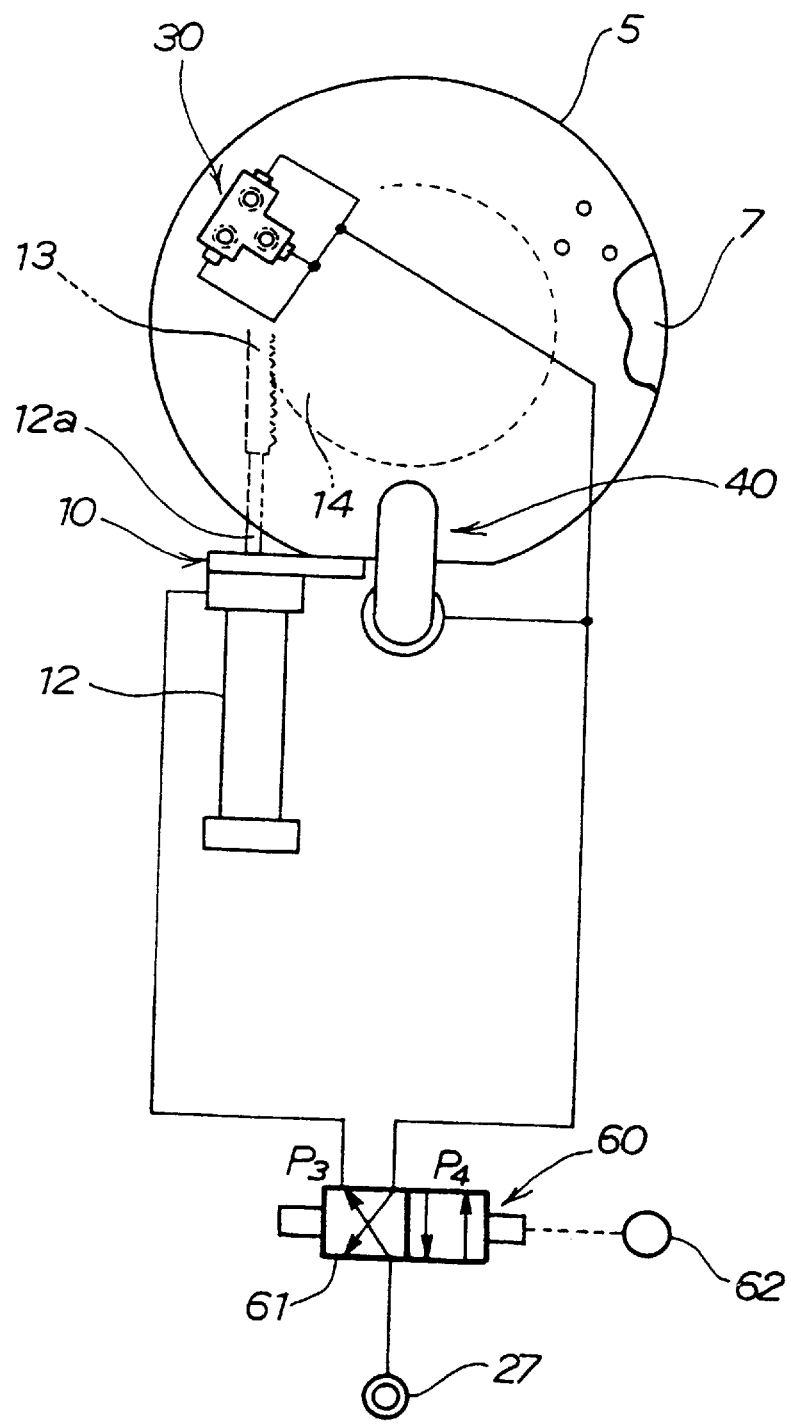
FIG. 14 is a schematic view illustrating the operation of a changeover device.
Figure 15:
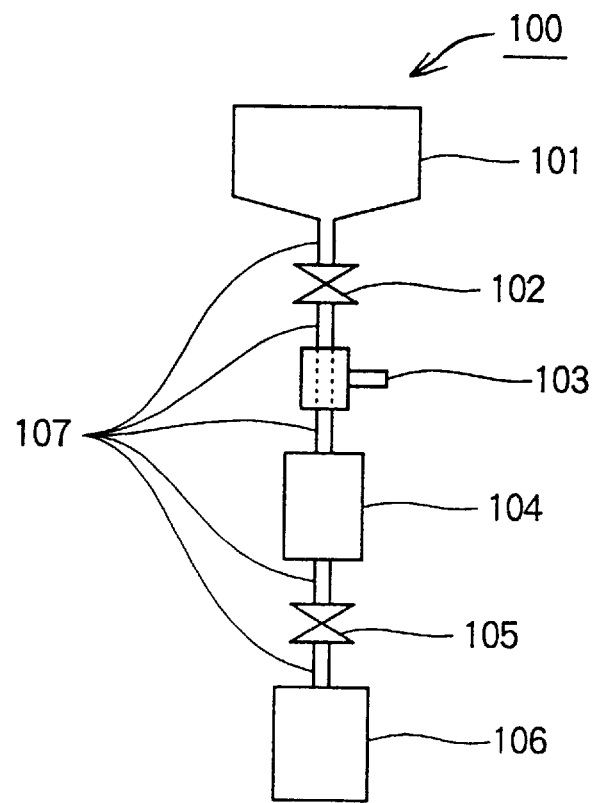
FIG. 15 is a schematic view illustrating the general arrangement of a conventional ball quantitative supply system.
Figure 16:
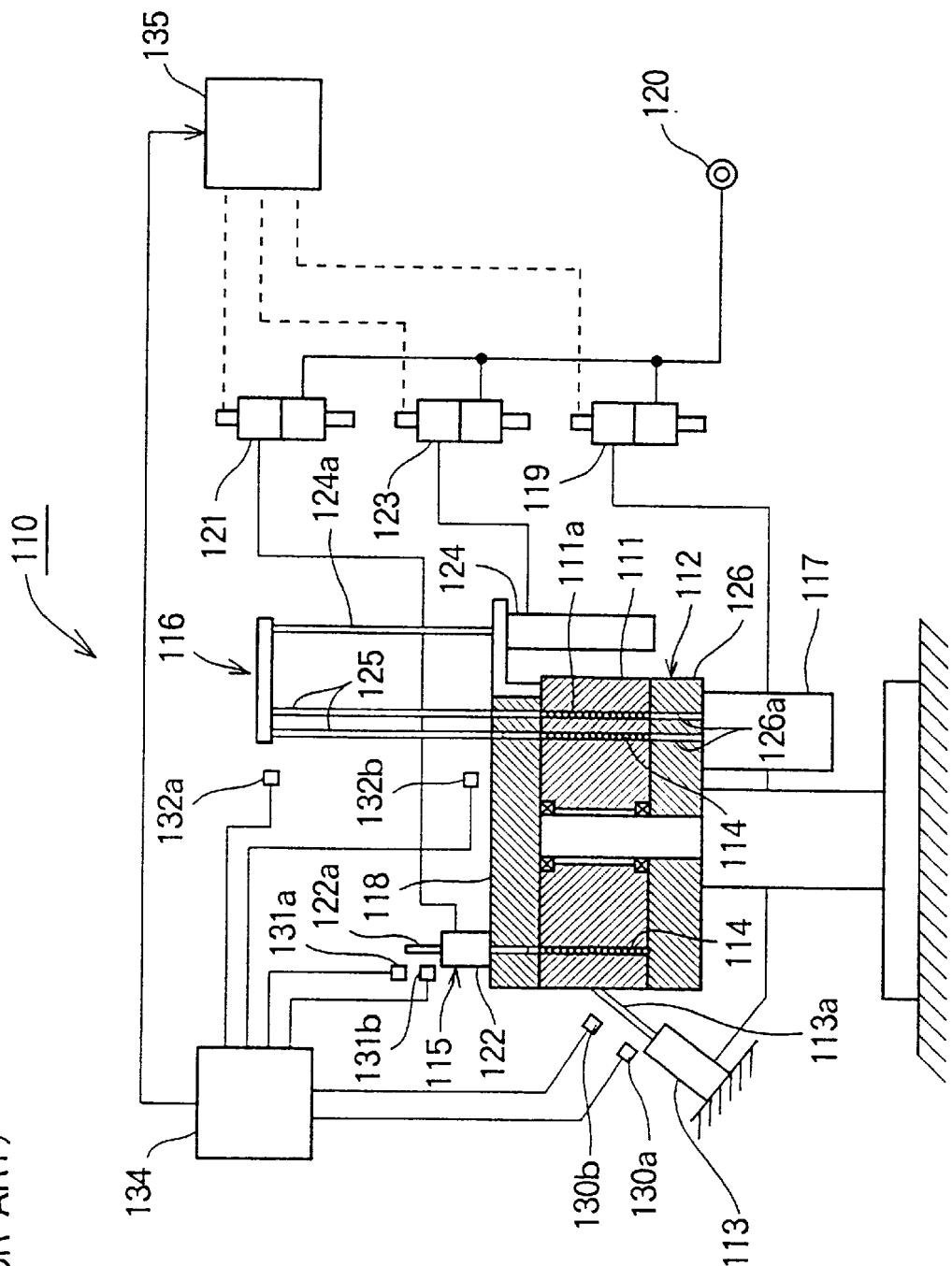
FIG. 16 is a schematic view illustrating the general arrangement of another conventional ball quantitative supply system which is an improved version of the apparatus shown in FIG. 15.

Reference is made to FIG. 14 illustrating the operation of the changeover device 60. By the changeover switch 62, the magnetic valve 61 is turned into a condition (rotational position $P_3$) as shown in the figure to supply air from the source of air supply 27 to the air cylinder 12 of the rotation drive apparatus 10. By such air supply to the air cylinder 12, the block 7 is turned in an anti-clockwise direction by 120°.

Then, by the changeover switch 62, the magnetic valve 61 is changed from the rotational position $P_3$ to a supply position $P_4$. As a result, the air supply to the air cylinder 12 is interrupted, thus allowing the piston rod 12a to extend by the resiliency of the return spring 16 (see FIG. 5). By such extension of the piston rod 12a, the rack 13 moves with the piston rod 12a to thereby effect rotation of the pinion 14 in a clockwise direction. In this instance, since the one-way clutch 15 (see FIG. 5) is released from its clutching operation, the rotary block 7 does not turn. Simultaneously, air is supplied from the source of air supply 27 to the ball detector 30 and the ball discharge apparatus 40.

In the above embodiment, the rotary block 7 is designed to be automatically rotated by the air cylinder 12, rack and pinion 13, 14, and one-way clutch 15. The present invention should not be construed as being limited to such embodiment since alternative arrangements are possible. For example, a manual lever may be secured to the rotary block 7 so that the block 7 can be manually rotated.

Again, while the ball discharge apparatus 40 has been described to have the push rods 43 being capable of descending movements, the present invention should not be construed as being limited to such embodiment. The apparatus may be designed such that the balls are supplied to the nut screws 54 by the weights of the balls per se, without the aid of the push rods 43. Alternatively, the push rods 43 may be arranged to be manually descendible.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A ball quantitative supply system for supplying a fixed number of balls to a work, comprising:

a ball feeder including a ball receiving chamber having a guide groove of V-shaped cross section, an air blow portion, and a ball discharge port, said ball feeder being adapted to blow air from said air blow portion into said guide groove so as to guide the balls one by one to said ball discharge port and then send out the balls from said ball discharge port;

a body apparatus including an upper plate, a lower plate, and a rotary block rotatably retained between said upper plate and said lower plate and having a ball receptacle for receiving a fixed number of balls sent out from said ball feeder, said body apparatus being adapted to confirm the fixed number of balls within said ball receptacle by means of a detection rod and to then discharge the balls to said work by means of a push rod; and a single changeover device including a first drive apparatus for rotating said rotary block, a second drive apparatus for effecting up and down movements of said detection rod, and a third drive apparatus for effecting up and down movements of said push rod, said changeover device being adapted to switch the actuation of said drive apparatuses.

2. A ball quantitative supply system for supplying a fixed number of balls to a work, including a ball feeder, said supply system comprising:

an upper plate having a ball receiving aperture for receiving balls fed from said ball feeder and a ball confirming aperture for confirming a fixed number of balls, said apertures being arranged to extend through different portions of said upper plate as viewed in top plan;

a lower plate having a ball discharge aperture extending therethrough; and a rotary block rotatably retained between said upper plate and said lower plate and having a ball receptacle passing therethrough for receiving the fixed number of balls, wherein said balls are received in said ball receptacle by causing an entrance of said ball receptacle to be aligned with said ball receiving aperture, then said rotary block is rotated to bring said ball receiving aperture entrance into alignment with said ball confirming aperture so as to count the number of balls within said ball receptacle, and thereafter said rotary block is further rotated to bring said ball receptacle entrance into alignment with said ball discharge aperture so as to supply the balls to said work.

3. A ball quantitative supply system according to claim 2, wherein said ball receiving aperture, said ball confirming aperture and said ball discharge aperture are positioned at an equal pitch of approximately 120° as viewed in top plan.

4. A ball quantitative supply system, including a ball feeder for sequentially sending out a plurality of balls in a row, for supplying a fixed number of the balls fed from said ball feeder to a work, said ball feeder comprising:

- at least one ball receiving chamber including a guide groove of V-shaped cross section having a guide passage formed at a bottom of said guide groove for guiding one of said balls;
- at least one air blow portion for blowing air into said ball receiving chamber to circulate said balls therein; and
- a ball discharge port for discharging said circulated balls one by one.

5. A ball quantitative supply system according to claim 4, wherein the position of said air blow portion is at one end of a horizontal center line of said guide groove of circular configuration as viewed in side elevation, and the position of said ball discharge port is at an opposite end of said horizontal center line of said guide groove.

6. A ball quantitative supply system according to claim 4, wherein said guide groove of V-shaped cross section is formed in at least a lower half of said ball receiving chamber of circular configuration as viewed in side elevation.

7. A ball quantitative supply system comprising a rotary block having a ball receptacle for receiving a fixed number of balls and upper and lower plates rotatably retaining said rotary block therebetween, wherein the fixed number of balls within said ball receptacle is detected through a ball confirming port by inserting a detection rod passing through said upper plate into said ball receptacle, the fixed number of balls within said ball receptacle is discharged downwardly from said ball discharge port by means of a push rod passing through said upper plate, said system further comprising:

- first drive means for rotating said rotary block;
- second drive means for effecting up and down movements of said detection rod;
- third drive means for effecting up and down movements of said push rod; and
- a changeover device adapted to make said second and third drive means inactive when said first drive means is actuated and to actuate said second and third drive means when said first drive means is inactive, said first, second and third drive means being connected to a common source of drive force.

8. A ball quantitative supply system according to claim 7, wherein said source of drive force is air, and said changeover device comprises an air flow passage switching valve.

* * * * *